(12) United States Patent
Hasegawa

(10) Patent No.: US 7,474,784 B2
(45) Date of Patent: Jan. 6, 2009

(54) IMAGE PROCESSING DEVICE, FOR PERFORMING COLOR CONVERSION, IMAGE PROCESSING METHOD FOR COLOR CONVERSION IMAGE PROCESSING PROGRAM FOR COLOR CONVERSION AND RECORDING MEDIUM

(75) Inventor: Noriko Hasegawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 738 days.

(21) Appl. No.: 10/858,061

(22) Filed: Jun. 2, 2004

(65) Prior Publication Data

US 2005/0129307 A1 Jun. 16, 2005

(30) Foreign Application Priority Data

Dec. 16, 2003 (JP) ............................ 2003-418326

(51) Int. Cl.
*G06K 9/00* (2006.01)
(52) U.S. Cl. ...................................... 382/167; 382/162
(58) Field of Classification Search ....................... None
See application file for complete search history.

(56) References Cited

U.S. PATENT DOCUMENTS

| 6,081,353 | A | * | 6/2000 | Tanaka et al. | 358/523 |
| 6,130,961 | A | * | 10/2000 | Akioka et al. | 382/167 |
| 6,909,523 | B2 | * | 6/2005 | Takahata et al. | 358/1.9 |
| 7,116,441 | B1 | * | 10/2006 | Matsuoka | 358/1.9 |
| 7,202,966 | B2 | * | 4/2007 | Nunokawa | 358/1.15 |
| 2002/0015162 | A1 | * | 2/2002 | Hoshii et al. | 358/1.2 |
| 2002/0030833 | A1 | * | 3/2002 | Kuwata et al. | 358/1.9 |
| 2004/0004731 | A1 | * | 1/2004 | Itagaki | 358/1.9 |
| 2004/0239744 | A1 | * | 12/2004 | Otsuki | 347/105 |

FOREIGN PATENT DOCUMENTS

| JP | A 11-187278 | 7/1999 |
| JP | A 2002-152542 | 5/2002 |

* cited by examiner

*Primary Examiner*—Matthew C Bella
*Assistant Examiner*—Yuzhen Ge
(74) *Attorney, Agent, or Firm*—Oliff & Berridge, PLC

(57) ABSTRACT

An image processing device performs a color process to a color image signal. The image processing device includes a profile designating section that designates a profile describing color reproducibility of a standard recording medium that is a target of color conversion, a recording medium designating section that designates a recording medium that is to be actually used, and color conversion section that performs color conversion according to the recording medium designated by the recording medium designating section and the profile designated by the profile designating section.

17 Claims, 16 Drawing Sheets

IMAGE PROCESSING DEVICE, FOR PERFORMING COLOR CONVERSION, IMAGE PROCESSING METHOD FOR COLOR CONVERSION IMAGE PROCESSING PROGRAM FOR COLOR CONVERSION AND RECORDING MEDIUM

BACKGROUND OF THE INVENTION

1. Field of the Invention

The present invention relates to an image processing technique for performing a color process to a color image signal upon forming an image on a recording medium in a digital copying machine, printer and the like.

2. Description of the Related Arts

There has been known a technique for performing a color matching process by utilizing a profile that describes a color characteristic of each device when a color management process is executed among different input and output devices, i.e., when a process is executed for reproducing almost the same color even by use of any input device or output device. The profile specified by the ICC is normally and popularly used as the standard of a profile for every device. The ICC profile is used for a color calibration, color proof and the like. In the conventional color calibration, it is used for a color conversion process from a printing machine, in which a color is desired to be matched, into a color printer for calibration.

In general, a color image signal given in the color calibration is a signal of a color space according to a printing machine to which the signal is outputted, so that CMYK color space is used, for example. Therefore, in the case of performing the color calibration, the color image signal of CMYK color space is once converted into a color image signal of a color space that is not dependent on the device, with the profile of the printing machine, and thereafter, it is converted into a color image signal of a CMYK color space that is dependent on the color printer, with the profile of the color printer for calibration.

Many of the profiles prepared for every device correspond to the case where a standard recording medium is used. An output device such as a printer is assumed, for example. Even when the same recording materials are used, a color reproducibility greatly differs depending upon a recording medium on which an image is formed. FIG. 15 is a graph showing a CMYK tone performance in a typical paper quality, while FIG. 16 is a graph similarly showing a color reproduction area. FIG. 15 shows a tone characteristic when tone representation is performed with a single color of each primary color C, M, Y and K, wherein the horizontal axis represents a color material amount (%) and the vertical axis represents a color difference $\Delta E$ from a white section of a sheet. As understood by referring to FIG. 15, it is found that a desired color development can not be obtained at a middle and high density area in the case of using uncoated paper compared to the case of using an art paper or coated paper. Further, as shown in FIG. 16, the reproducible color area is narrow in the uncoated paper, compared to the art paper, so that it is found that a bright color cannot be reproduced.

As described above, the tone characteristic and color reproduction area are different depending upon a paper quality. Therefore, there arises a problem that, even when color conversion is performed by use of a profile of a standard printing condition for forming an image, the reproduced color is different depending upon the used recording medium.

In order to perform a color conversion process considering a color reproducibility that is different per recording medium, it is necessary to use a profile that is established by considering the color reproducibility of the recording medium to be used. Accordingly, there arises a problem that a profile should be newly generated for performing color conversion when a printed matter printed on a recording medium other than a standard recording medium is desired to be color-matched to the other printed matters. The generation of a profile requires a profile creating application or an expensive measuring device, thereby entailing a problem that a color-matching cannot easily be executed.

Further, even if profiles each corresponding to each recording medium are prepared, plural profiles should be prepared corresponding to many recording mediums as for each profile according to each device or printing characteristic, so that the number thereof becomes enormous. Moreover, it is not easy to select a desired profile among such enormous profiles upon using profiles, thereby entailing a problem of being difficult to use these profiles.

SUMMARY OF THE INVENTION

The present invention is accomplished in view of the abovementioned circumstances, and aims to provide an image processing device and image processing method capable of simply performing a color process so as to attain an optimum color reproduction in a recording medium to be used. The invention further aims to provide an image processing program for causing a computer to execute a function of such an image processing device or image processing method and a recording medium that stores such an image processing program.

An image processing device according to the present invention for performing a color process to a color image signal can designate a recording medium to be actually used as well as a profile in which a color reproducibility of a standard recording medium that is a target of color conversion is described. Color conversion is executed to a color image signal according to these designated profile and recording medium.

BRIEF DESCRIPTION OF THE DRAWINGS

Preferred embodiments of the present invention will be described in detail based on the following figures, wherein.

DESCRIPTION OF THE PREFERRED EMBODIMENTS

Figure 1:
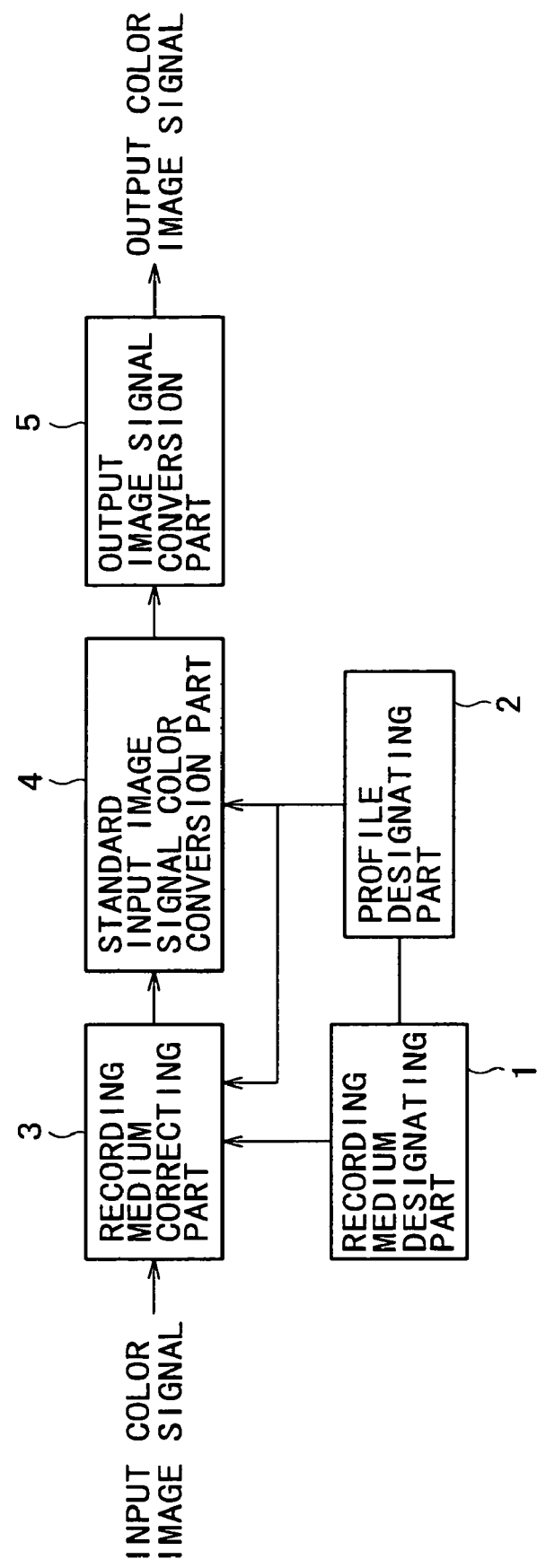
FIG. 1 is a block diagram showing a first embodiment of the present invention.

FIG. 1 is a block diagram showing a first embodiment of the present invention. In the figure, numeral 1 denotes a recording medium designating part, 2 denotes a profile designating part, 3 denotes a recording medium correcting part, 4 denotes a standard input image signal color conversion part and 5 denotes an output image signal conversion part. An input color image signal in the present invention is created by assuming that it is printed by use of a specific recording medium in some specific device. Further, an output color image signal that is subject to a process to be outputted is an image signal to be printed in a device that actually prints and a recording medium.

The recording medium designating part 1 designates a recording medium (hereinafter referred to as a target recording medium) that is used for actually forming an image with the output color image signal. Further, a profile corresponding to the input color image signal is designated at the profile designating part 2. This profile describes a color reproducibility that is a target for the color conversion of the input color image signal, wherein it has an assumption to form an image by use of a standard recording medium.

The recording medium correcting part 3, standard input image signal color conversion part 4 and output image signal conversion part 5 constitute a color conversion section of the present invention, which performs color conversion according to designation of a recording medium by the recording medium designating part 1 and a profile designated by the profile designating part 2.

The recording medium correcting part 3 corrects a difference in color reproducibility between the target recording medium designated by the recording medium designating part 1 and the standard recording medium that is defined as a premise by the profile designated by the profile designating part 2. The correction of the difference is achieved only by correcting the difference in both printing conditions.

The standard input image signal color conversion part 4 performs color conversion according to the profile designated by the profile designating part 2. Further, the output image signal conversion part 5 performs color conversion by use of a profile corresponding to the device that actually forms an image. Color matching is provided between the output device that is assumed by the input color image signal and the device that actually forms an image by the standard input image signal color conversion part 4 and the output image signal conversion part 5.

The color conversion by the standard input image signal color conversion part 4 and the output image signal conversion part 5 is conventionally performed. However, when the target recording medium used for actually forming an image is different from the standard recording medium, a color may differ as described above. In the present invention, the recording medium correcting part 3 performs a correcting process to correct the difference in color reproducibility between the recording mediums, thereby realizing color-matching even if different types of recording mediums are used. Moreover, the designated profile is used as it is, so that color-matching can simply be achieved without performing a color measurement or generating a new profile.

Figure 2:
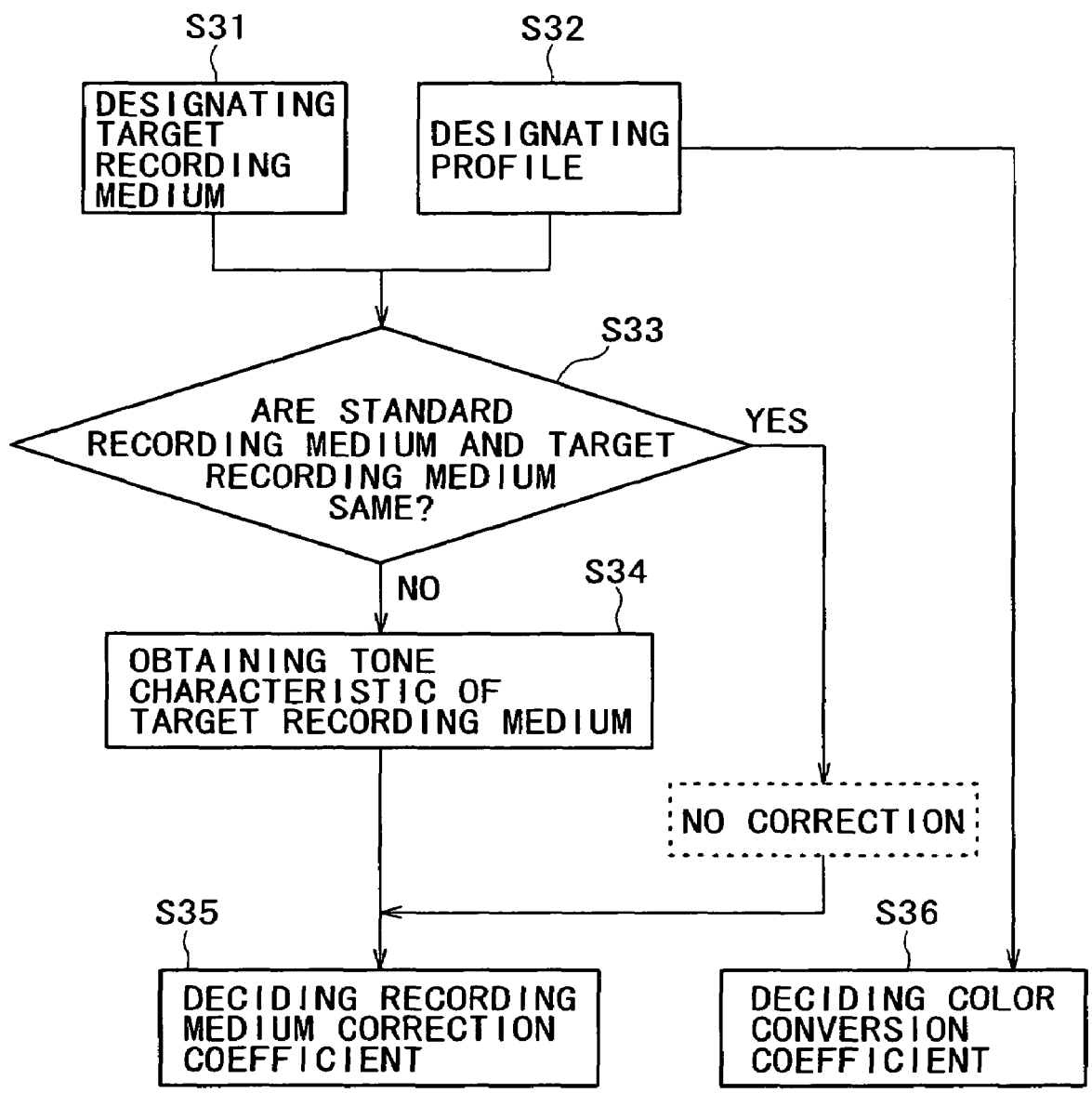
FIG. 2 is a flowchart showing one example of an operation in the first embodiment of the invention.

FIG. 2 is a flowchart showing one example of an operation in the first embodiment of the present invention. Firstly, a target recording medium is designated at the recording medium designating part 1 at a step S31. Further, a profile corresponding to the input color image signal is designated at a step S32. Either the designation of the recording medium at the step S31 or the designation of the profile at the step S32 may be performed first.

It should be noted that the profile designated at the step S32 is decided as it is at a step S36 as a color conversion coefficient used for performing color conversion at the standard input image signal color conversion part 4.

At a step S33, it is determined whether or not the target recording medium designated at the step S31 is the standard recording medium that is assumed in the profile designated at the step S32. If they are different, a tone characteristic of the target recording medium is obtained at a step S34 and a correction coefficient used for the correcting process at the recording medium designating part 1 is decided at a step S35 by use of the obtained tone characteristic. For example, a correction coefficient may be decided that corrects the difference in color reproducibility between the designated target recording medium and the standard recording medium.

In the case where the target recording medium matches to the standard recording medium, it is unnecessary to perform the correcting process at the recording medium correcting part 3. Accordingly, it is decided at the step S35 that the correction is not performed, whereby the correcting process is omitted at the recording medium correcting part 3. Alternatively, a non-corrected correction coefficient is decided.

As described above, the correction coefficient decided at the step S35 is set to the recording medium correcting part 3, and the color conversion coefficient decided at the step S36 is set to the standard input image signal color conversion part 4. Then, the correcting process for corresponding to the target recording medium is performed for the input color image signal at the recording medium correcting part 3, whereupon the input color image signal that has already been subject to the correcting process is converted into a device-independent color image signal at the standard input image signal color conversion part 4 and the resultant is further converted into an output color image signal that is dependent on the device actually forming an image at the output image signal conversion part 5.

Figure 3:
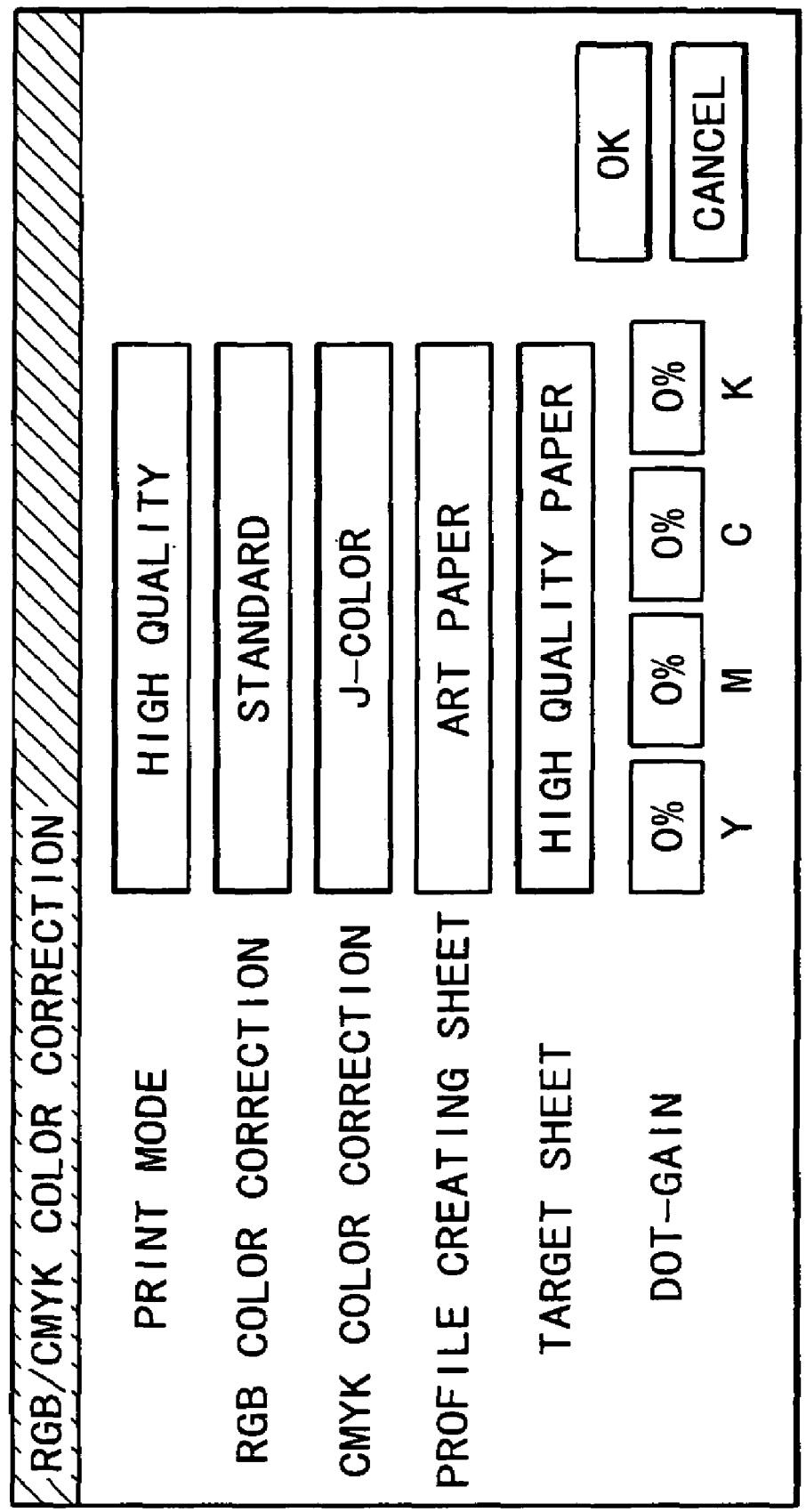
FIG. 3 is an explanatory view of one example of a designation screen of a target recording medium and a profile by a recording medium designating part 1 and a profile designating part 2.
Figure 4:
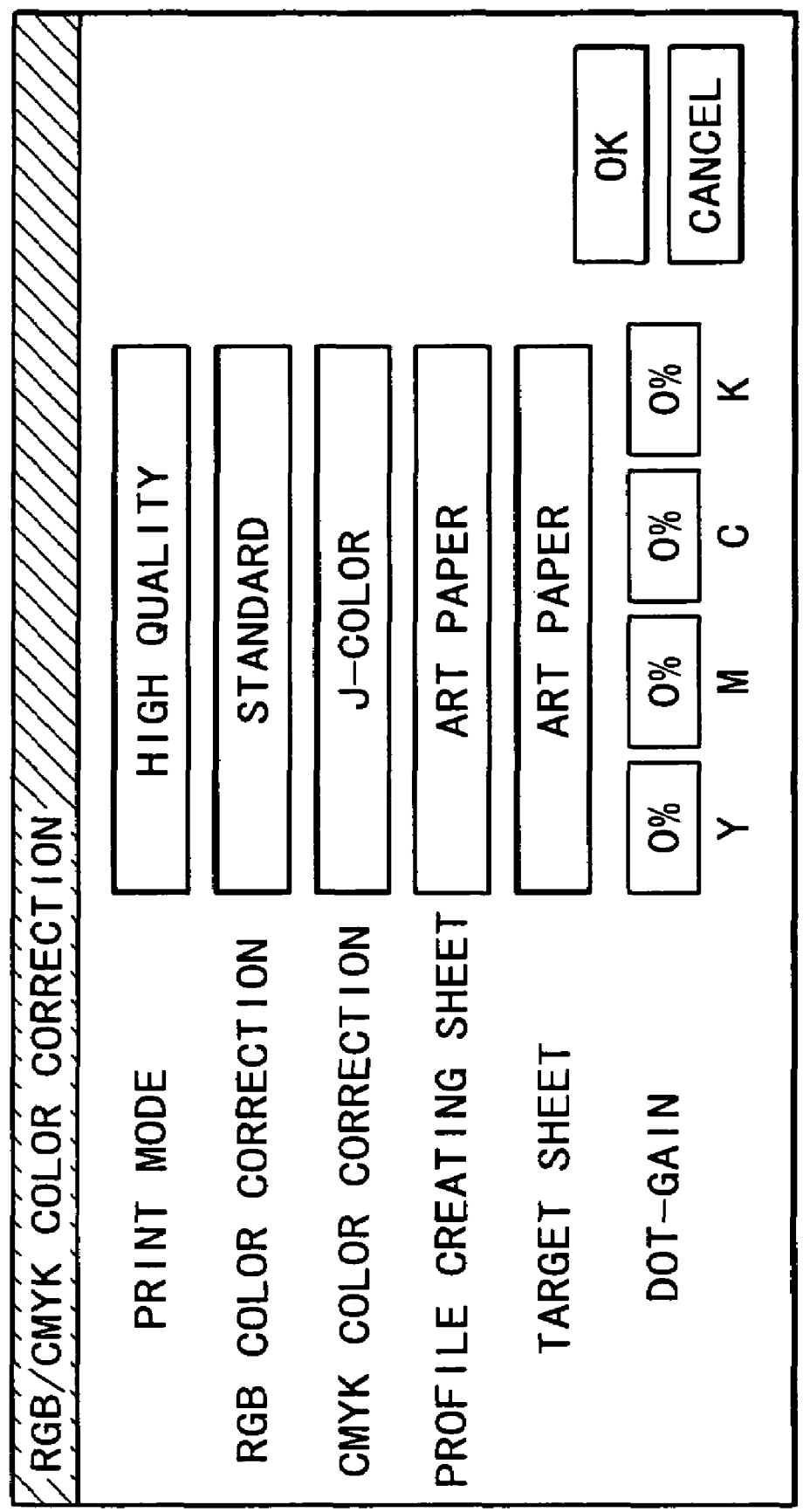
FIG. 4 is an explanatory view of another example of a designation screen of a target recording medium and a profile by a recording medium designating part 1 and a profile designating part 2.

FIGS. 3 and 4 are explanatory views of one example of a designation screen of the target recording medium and the profile by the recording medium designating part 1 and the profile designating part 2. The designation of the target recording medium at the step S31 and the designation of the profile at the step S32 in FIG. 2 can be performed by use of, for example, a user interface shown in FIG. 3. In the examples of the display screen shown in FIGS. 3 and 4, arranged items include a print mode, RGB color correction, CMYK color correction, profile creating sheet, target sheet, dot-gain and the like. Among these items, the CMYK color correction item is a section for performing the designation of the profile by the profile designating part 2. A standard recording medium that is assumed in the selected profile is displayed in a space of the profile creating sheet. It is supposed here that a selectable profile is associated with a standard recording medium. Moreover, the items of the target sheet is a section for performing the designation of the target recording medium by the recording medium designating part 1.

In the example shown in FIG. 3, "J-Color" is selected in the CMYK color correction item, so that its corresponding profile is designated. Further, displayed on the space of the profile creating sheet is that the standard recording medium in this profile is "art paper".

Moreover, "uncoated paper" is designated as the target recording medium in the space of the target sheet. This is different from the "art paper" that is the recording medium designated as the standard recording medium displayed on the space of the abovementioned profile creating sheet. In the case where the standard recording medium and the target recording medium are different from each other as described above, the tone characteristic of the target recording medium is obtained at the step S34, and then, the difference between the standard recording medium and the target recording medium is decided at the step S35 as a correction coefficient in the example of the operation shown in FIG. 2. Then, the correcting process is performed at the recording medium designating part 1 by use of this correction coefficient, thereby absorbing the difference in color reproducibility due to the fact that the recording mediums are different from each other. Consequently, a color-matching can be implemented within the range of the color reproduction area.

In the example shown in FIG. 4, the "J-Color" is selected in the CMYK color correction item like the example shown in FIG. 3. Moreover, "art paper" is designated as the target recording medium in the space of the target sheet. In this example, the "art paper" designated as the standard recording medium displayed on the space of the profile creating sheet matches to the target recording medium designated in the space of the target sheet. In the case where the standard recording medium and the target recording medium agree with each other as described above, the program moves from the step S33 to the step S35 to decide that the correcting process is not performed in the example of the operation shown in FIG. 2, thereby being capable of omitting the correcting process at the recording medium correcting part 3. Alternatively, a non-corrected correction coefficient is decided.

Figure 5A:
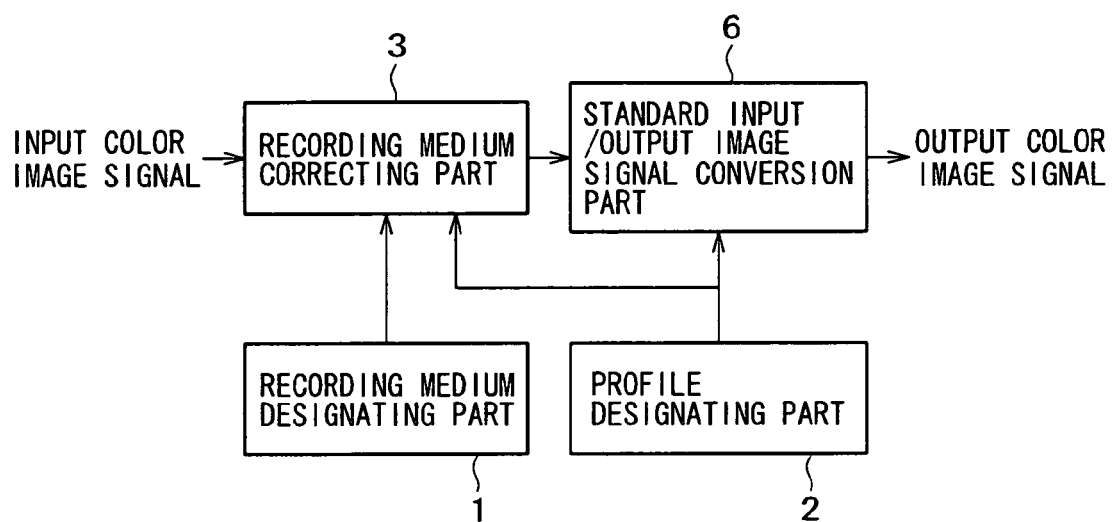
FIG. 5A and 5B are block diagrams showing a modified example of the first embodiment of the present invention.

FIG. 5 is a block diagram showing a modified example in the first embodiment of the present invention. In the figure, numeral 6 denotes a standard input/output image signal conversion part. In the constructional example shown in FIG. 1, the color conversion process according to the input profile at the input side and the color conversion process according to the profile at the output side are respectively performed by the standard input image signal color conversion part 4 and the output image signal conversion part 5. The modified example shown in FIG. 5A represents the configuration in the case where a link profile is given that is obtained by unifying the profile at the input side and the profile at the output side. At the standard input/output image signal conversion part 6, the color conversion process is performed to the input color image signal that is corrected at the recording medium correcting part 3 by use of the link profile designated at the profile designating part 2, thereby obtaining the output color image signal.

Figure 5B:
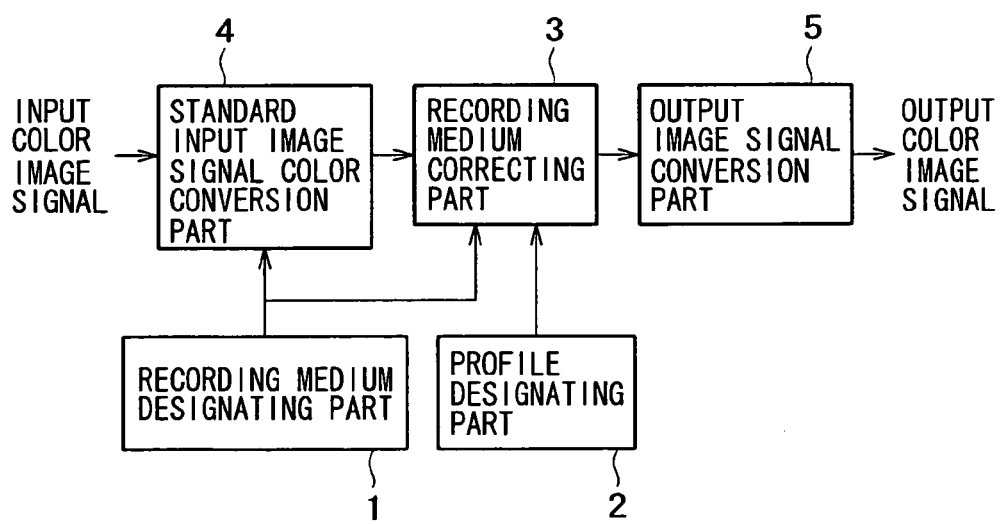

The modified example shown in FIG. 5B represents that the order of the processes at the recording medium correcting part 3 and the standard input image signal color conversion part 4 is changed. In this way, it can be configured such that the correcting process according to the recording medium to be used is performed at the recording medium correcting part 3 to the color image signal that has already been color-converted at the standard input image signal color conversion part 4. It should be noted that an image is frequently converted into a color space that is different from the input color image signal at the standard input image signal color conversion part 4, such as, for example, the case where it is converted into a color image signal having a device-independent color space. In this case, the recording medium correcting part 3 performs a correcting process according to the color reproducibility of the recording medium in the corresponding color space.

Further, a modification is also possible wherein the process at the recording medium correcting part 3 is executed after the process at the output image signal conversion part 5, or the order of the processes at the standard input/output image signal conversion part 6 and at the recording medium correcting part 3 are switched in the configuration shown in FIG. 5A.

Figure 6:
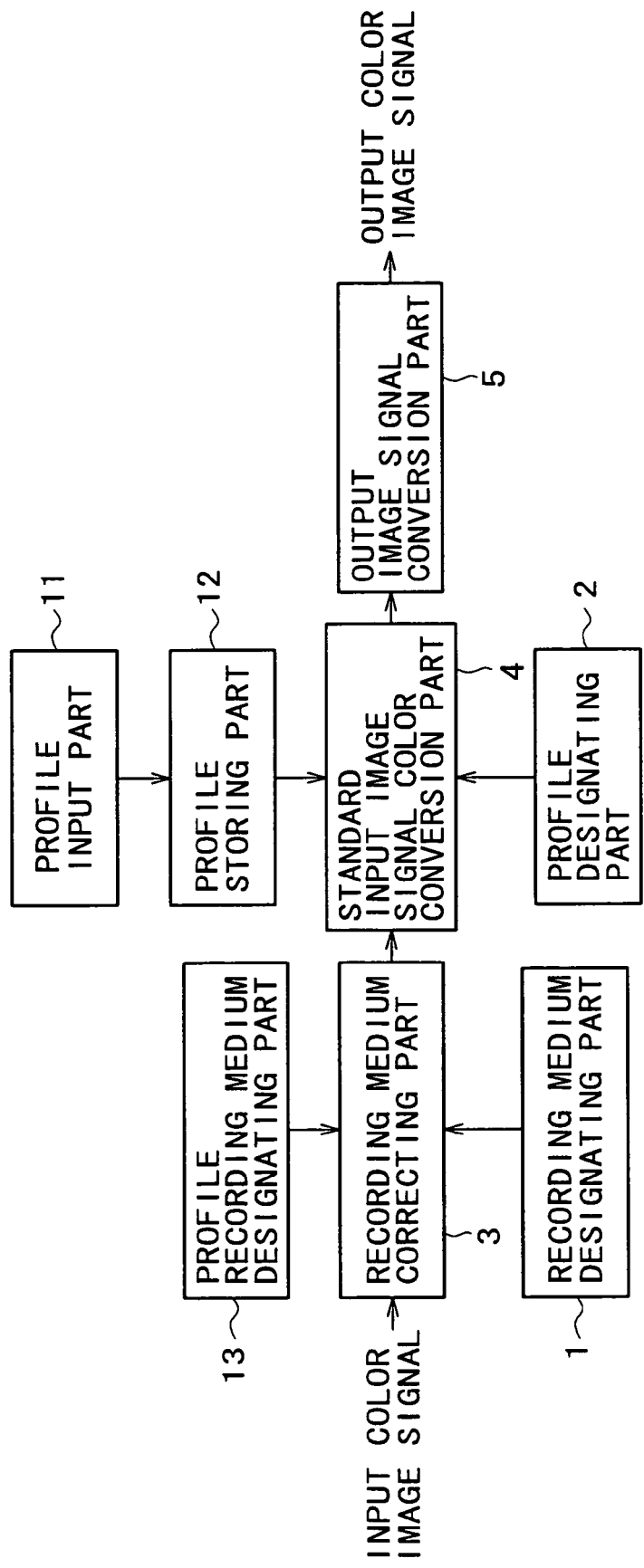
FIG. 6 is a block diagram showing a second embodiment of the present invention.

FIG. 6 is a block diagram showing a second embodiment of the present invention. In the figure, same numerals are given to parts same as those in FIG. 1 for omitting the repeated explanation thereof. Numeral 11 denotes a profile input part, 12 denotes a profile storing part and 13 denotes a profile recording medium designating part. This second embodiment shows the case where a color conversion process is possible by utilizing an externally supplied profile. The profile input part 11 receives an externally supplied profile. For example, a color patch is actually printed on a recording medium by an image processing device, and a profile created by measuring the color of the color patch can be inputted.

The profile storing part 12 stores the profile received at the profile input part 11. It is needless to say that a profile using a presupplied standard recording medium may be stored. The profile designating part 2 can designate the profile stored in the profile storing part 12.

In the case where the profile designated at the profile designating part 2 is the one created by the color-measurement and received at the profile input part 11 as described above, the profile recording medium designating part 13 receives the designation of the recording medium that is used in creating this profile.

The recording medium designated at the profile recording medium designating part 13 is used as the standard recording medium.

Figure 7:
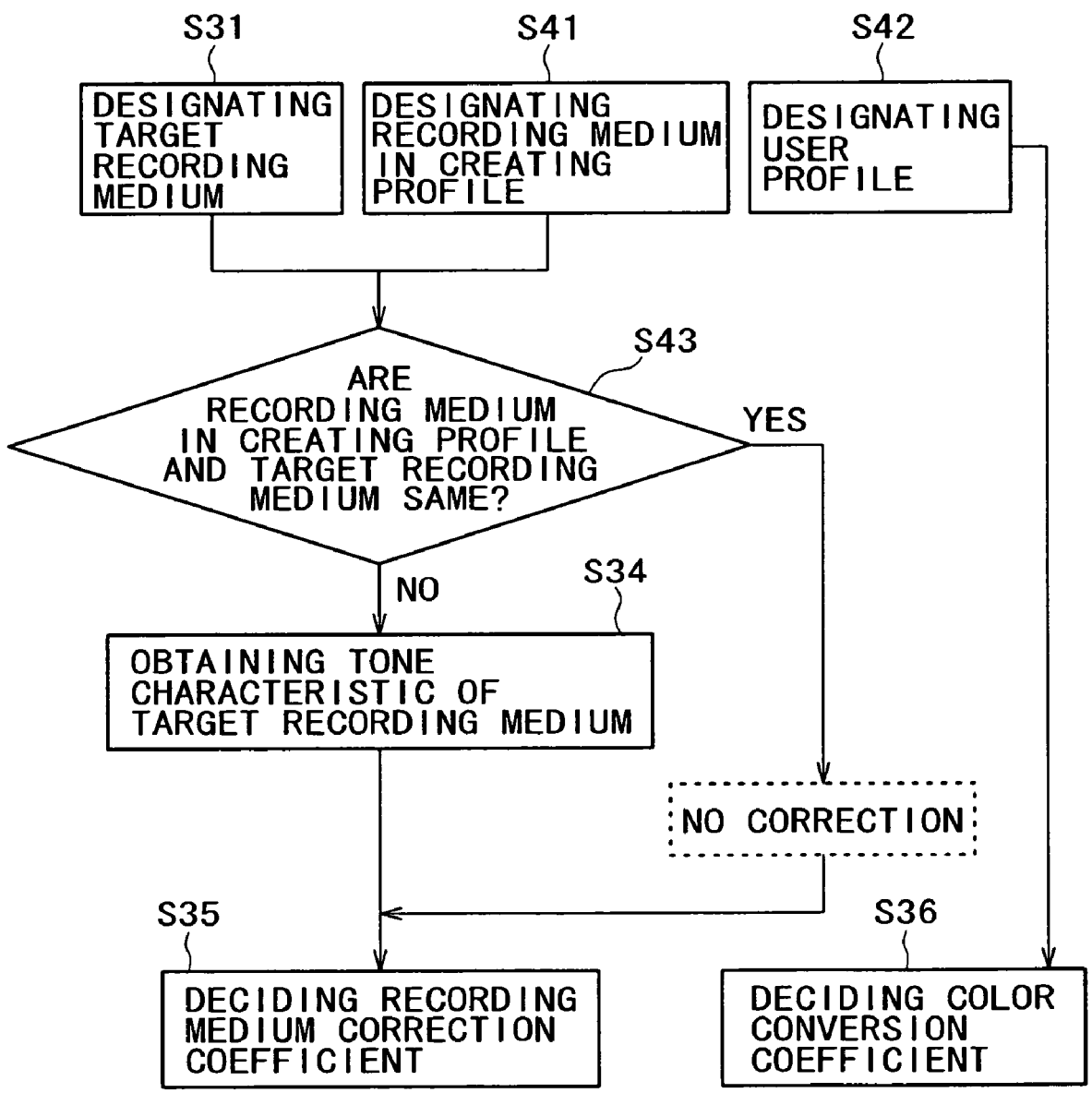
FIG. 7 is a flowchart showing one example of an operation in the second embodiment of the invention.

FIG. 7 is a flowchart showing one example of an operation in the second embodiment of the present invention. It should be noted that the steps performing the same process as those in FIG. 2 are marked with the same numerals. In this second embodiment, a target recording medium is designated at a step S31, a profile stored in the profile storing part 12 is designated at a step S42 and the recording medium used for creating the profile designated at the step S42 is designated at the profile recording medium designating part 13 at a step S41. The designated recording medium is used in the following process as the standard recording medium. Any one of these three designations may be performed first. The profile designated at the step S42 is decided as it is at a step S36 as a color conversion coefficient used upon performing the color conversion at the standard input image signal color conversion part 4.

At a step S43, it is determined whether or not the target recording medium designated at the step S31 and the recording medium (standard recording medium) designated at the step S41 agree with each other. If they are different, a tone characteristic of the target recording medium is obtained at a step S34 and a correction coefficient used for the correcting process at the recording medium designating part 1 is decided at a step S35 by use of the obtained tone characteristic. For example, a correction coefficient may be decided that corrects the difference in color reproducibility between the target recording medium designated at the step S31 and the standard recording medium designated at the step S41

In the case where the target recording medium matches to the standard recording medium, it is unnecessary to perform the correcting process at the recording medium correcting part 3. Accordingly, it is decided at the step S35 that the correction is not performed, whereby the correcting process is omitted at the recording medium correcting part 3. Alternatively, a non-corrected correction coefficient is decided.

As described above, the correction coefficient decided at the step S35 is set to the recording medium correcting part 3, and the color conversion coefficient decided at the step S36 is set to the standard input image signal color conversion part 4. Then, the correcting process for corresponding to the target recording medium is performed for the input color image signal at the recording medium correcting part 3, whereupon the input color image signal that is already subject to the correcting process is converted into a device-independent color image signal at the standard input image signal color conversion part 4 and the resultant is further converted into an output color image signal that is dependent on the device actually forming an image at the output image signal conversion part 5 to be outputted.

Figure 8:
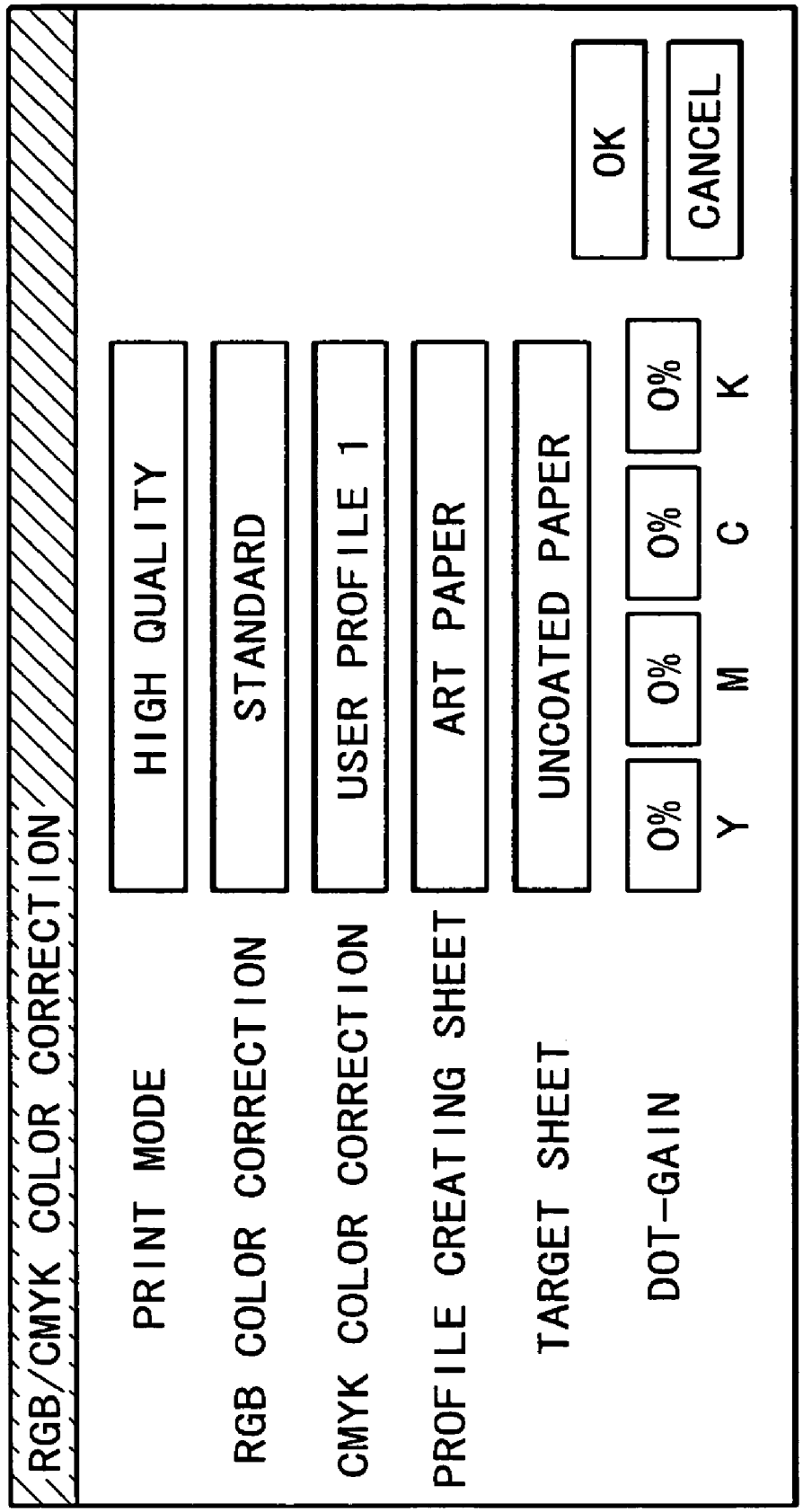
FIG. 8 is an explanatory view of one example of a designation screen by a recording medium designating part 1, a profile designating part 2 and a profile recording medium designating part 13.

FIG. 8 is an explanatory view of one example of a designation screen by the recording medium designating part 1, profile designating part 2 and profile recording medium designating part 13. In the example shown in FIG. 8, the same items as those in FIGS. 3 and 4 are displayed and are configured such that an input can be made. In this example, a "user profile 1" is designated at the space of the CMYK color correction. This means that the externally supplied profile is received at the profile input part 11 and the profile stored in the profile storing part 12 is designated.

With respect to the externally supplied profile that is created by a user, a recording medium used upon creating this profile is unknown. Therefore, in the case where the externally inputted profile is designated to be used like this example, the recording medium used in creating this profile is designated in the space of the profile creating sheet. "art paper" is designated here.

Further, "uncoated paper" is designated as the target recording medium in the space of the target sheet. Since the standard recording medium (the recording medium designated in the space of the profile creating sheet) and the target recording medium (the recording medium designated in the space of the target sheet) are different from each other, the tone characteristic of the target recording medium is obtained at the step S34, and then, the difference between the standard recording medium and the target recording medium is decided at the step S35 as a correction coefficient in the example of the operation shown in FIG. 7. Then, the correcting process is performed at the recording medium designating part 1 by use of this correction coefficient, thereby absorbing the difference in color reproducibility due to the fact that the recording mediums are different. Consequently, a color-matching can be implemented within the range of the color reproduction area.

In this way, the recording medium used in creating the profile to be used is designated at the recording medium designating part 13, whereby the difference in color reproducibility between recording mediums can be corrected even if an externally supplied profile is used. Consequently, color reproducibility can further be enhanced in various recording mediums.

Figure 9:
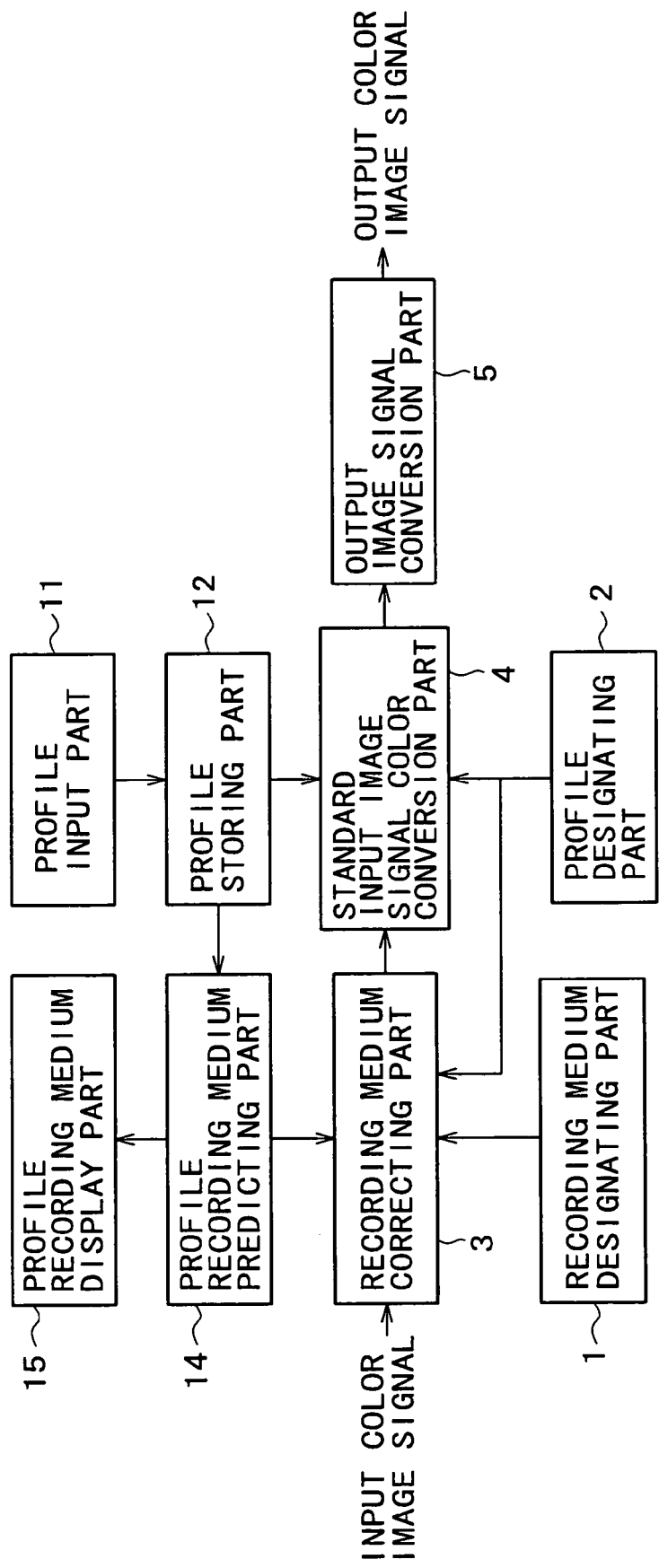
FIG. 9 is a block diagram showing a modified example of the second embodiment of the present invention.

FIG. 9 is a block diagram showing a modified example in the second embodiment of the present invention. In the figure, numeral 14 denotes a profile recording medium predicting part and 15 denotes a profile recording medium display part. In the constructional example shown in FIG. 6, in the case where an externally supplied profile is used, the recording medium used in creating this profile is designated at the profile recording medium designating part 13. This modified example represents that the recording medium used in creating the profile is predicted to some degree from the designated profile.

The recording mediums actually used are diverse. However, these diverse recording mediums can be classified into groups to some degree by collecting those having similar color reproducibility. The profile recording medium predicting part 14 predicts which color reproducibility a recording medium has that is used in the profile designated by the profile designating part 2. The predicted result is displayed on the profile recording medium display part 15 to inform the user of it. A color look-up table in the profile can be used for the prediction of the recording medium. A recording medium can be predicted to some degree by converting a predetermined value with the use of this color look-up table and referring to the outputted value. It should be noted that usable predetermined values include, for example, the one of K=100%, saturated color (C, M or Y=100%) or other various colors.

Figure 10:
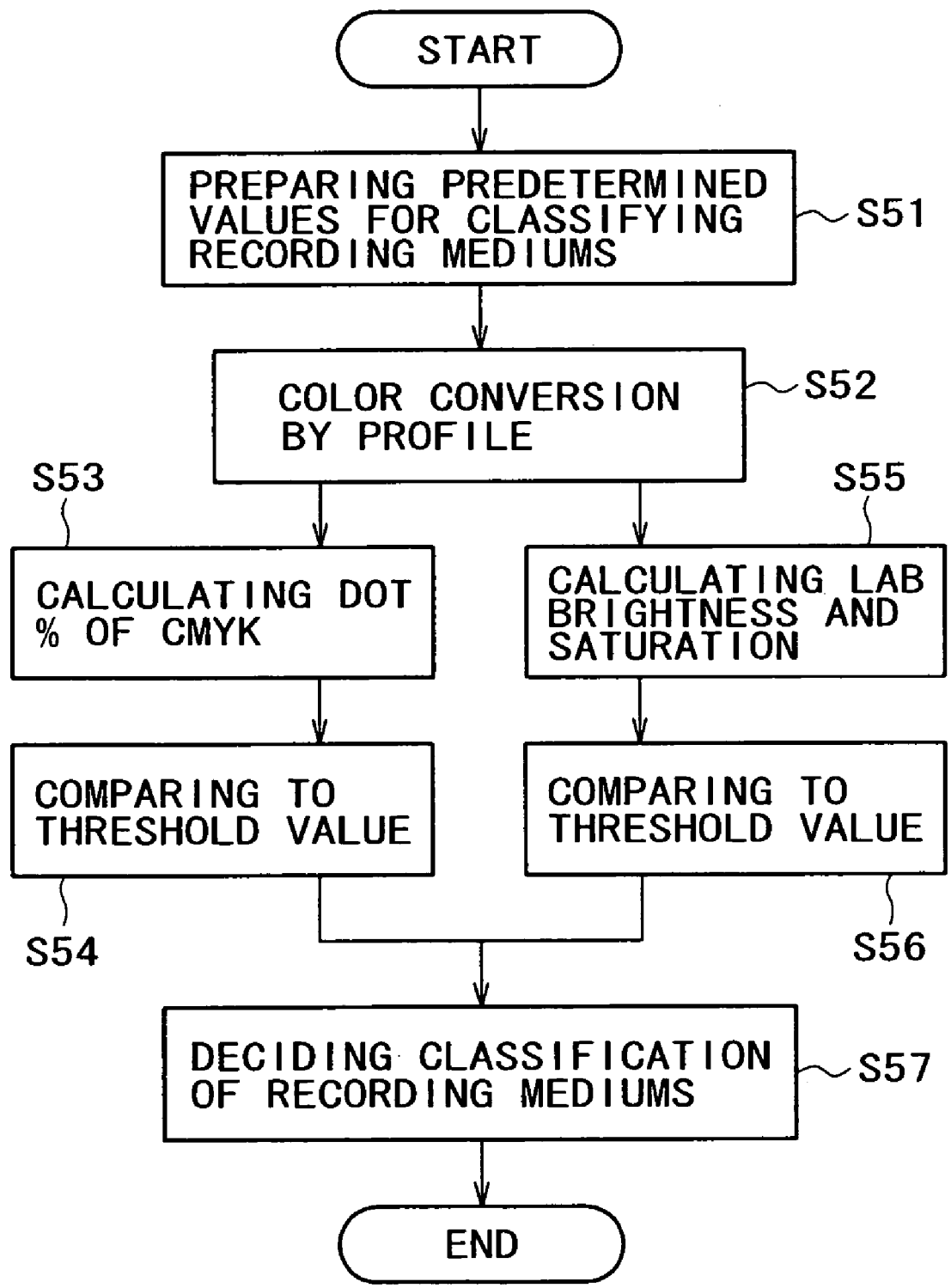
FIG. 10 is an explanatory view of one example of a method for determining a recording medium used upon creating a profile at a profile recording medium predicting part 14.

FIG. 10 is an explanatory view showing one example of a method for determining the recording medium used upon creating the profile at the profile recording medium predicting part 14. At first, predetermined values for classifying the recording medium used in creating the profile are prepared at a step S51 . As the predetermined values, plural data pieces including K=100% and K and plural data pieces formed of saturated color (C, M or Y=100%) and CMY. At a step S52, these predetermined values are converted by use of the designated profile to calculate, for example, the value of CMYK dot % at a step S53. At a step S54 , the value of the CMYK dot % calculated at the step S53 is compared to a threshold value, whereby the recording mediums used in creating the profile can be classified.

Alternatively, brightness and saturation are calculated at a step S55 from the result of the conversion by use of the profile at the step S52 and compares the brightness and saturation to a threshold value at a step S56, whereby the recording mediums used upon creating the profile can also be classified. It is needless to say that the determination using the CMYK dot % at the steps S53 and S54 and the determination using the brightness and saturation at the steps S55 and S56 may both be used.

Such determination is performed for every predetermined value prepared at the step S51 and each determination result is considered, thereby being capable of classifying the recording mediums. In this case, the classification may be performed by prioritizing or weighing the color to be used. For example, when the determination results of K=100% and saturated color take priority and these results show different classification, a determination result using the other color may be used.

After classifying the recording mediums as described above, the typical one among the classified recording mediums is displayed on the profile recording medium display part 15 to inform the user of it. For example, when a profile and a target recording medium are designated by the display screen shown in FIGS. 3 and 4, a type of the predicted recording medium can be displayed in the space of the profile creating sheet. The configuration may of course be applied wherein an input can be made in the space of the profile creating sheet as shown in FIG. 8 and the type of the predicted recording medium may be displayed beforehand.

The following processes are the same as those in the example of the operation shown in FIG. 2 or FIG. 7.

Specifically, the color reproducibility of the classified recording medium is used as the color reproducibility of the abovementioned standard recording medium, whereupon a correction coefficient for correcting the difference in color reproducibility between the standard recording medium and the target recording medium is obtained to thereby perform the correcting process at the recording medium correcting part 1.

Figure 11:
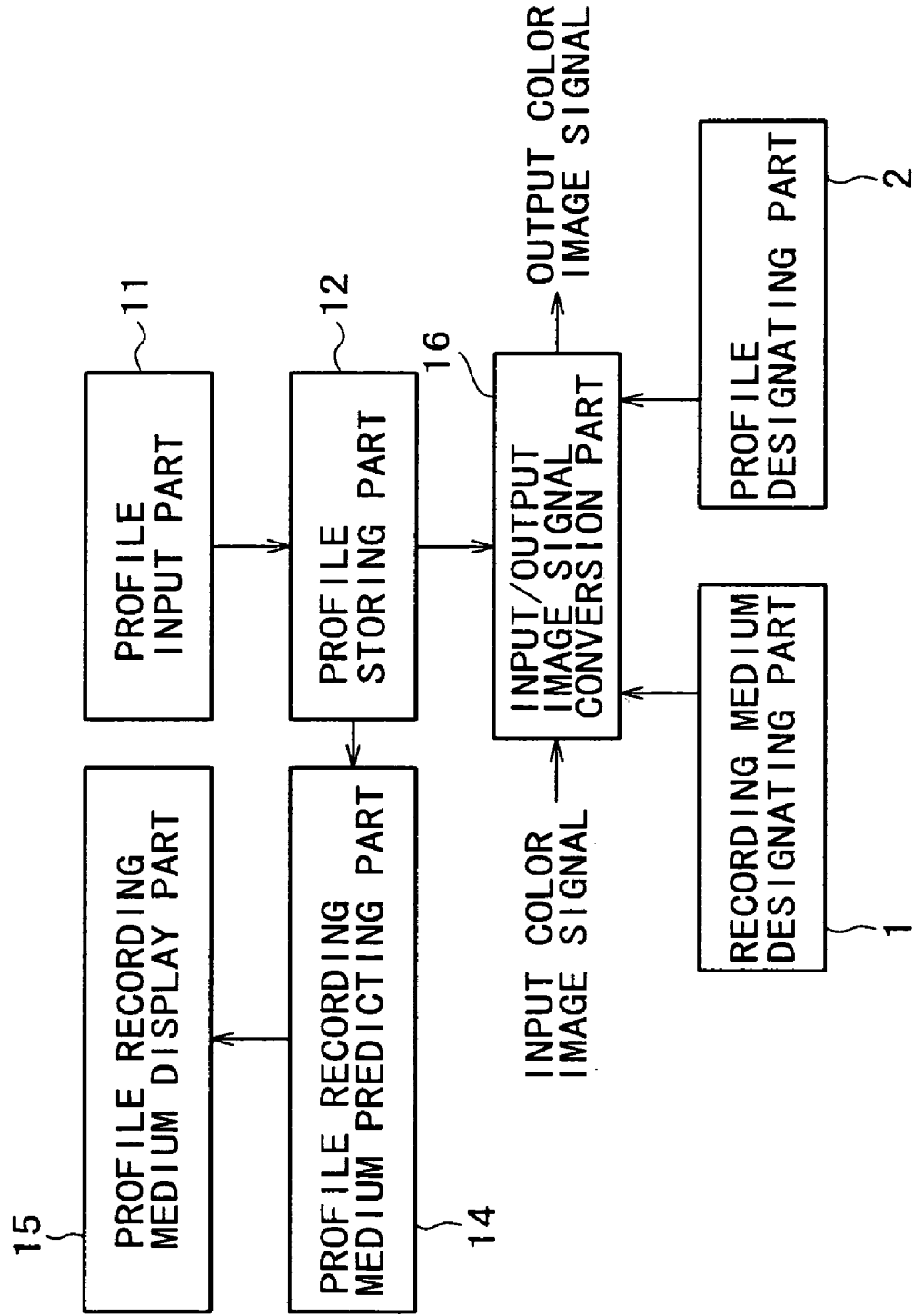
FIG. 11 is a block diagram showing another modified example of the second embodiment of the present invention.

FIG. 11 is a block diagram showing another modified example of the second embodiment of the present invention.

In the figure, numeral 16 denotes an input/output image signal conversion part. It is considered, for example, that a profile created for every recording medium is given as an externally supplied profile. In this case, a profile stored in the profile storing part 12 may be selected according to both the recording medium designated by the recording medium designating part 1 and the profile designating part 2 and the profile in which a standard recording medium is assumed.

The example shown in FIG. 11 shows the case where the externally supplied profile for every recording medium is a link profile, wherein the input/output image signal conversion part 16 obtains a profile, corresponding to the recording medium designated at the recording medium designating part 13 and the profile designated at the profile designating part 2, from the profile storing part 12 and a color conversion process is performed to the input color image signal to thereby output the output color image signal.

In the case where the profile at the input side and the profile at the output side are different from each other, it is of course configured such that an input image signal color conversion part and an output image signal color conversion part are provided for selecting a profile at the input side created for every recording medium according to the designation at the recording medium designating part 1 and the profile designating part 2, whereby the color conversion may be performed at the input image signal color conversion part.

It should be noted that, in this second embodiment too, various modifications such as the one shown in FIG. 5 are possible other than the abovementioned modified example, like the first embodiment.

Figure 12:
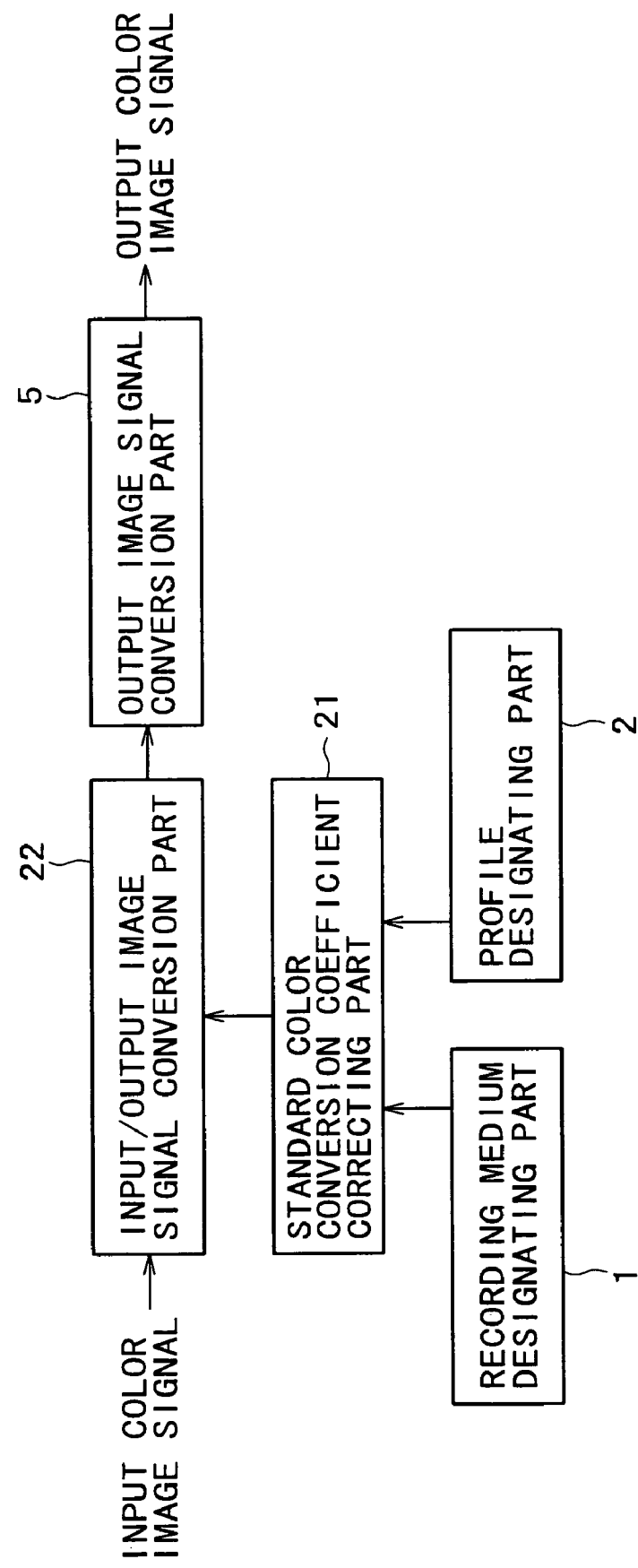
FIG. 12 is a block diagram showing a modified example of a third embodiment of the present invention.

FIG. 12 is a block diagram showing a modified example in the third embodiment of the present invention. In the figure, numeral 12 denotes a standard color conversion coefficient correcting part and 22 denotes an input image signal color conversion part. In the abovementioned first and second embodiments, the designated profile is used as it is and a portion relating to the difference in color reproducibility of the recording medium is corrected. This third embodiment shows an example wherein a profile is changed according to the difference in color reproducibility of the recording medium.

The standard color conversion coefficient correcting part 21 corrects the profile designated at the profile designating part 2 according to the difference in color reproducibility between the recording medium designated at the recording medium designating part 1 and the standard recording medium. The input image signal color conversion part 22 performs color conversion of the input color image signal according to the profile corrected at the standard color conversion coefficient correcting part 21. It should be noted that the output image signal conversion part 5 is the same as that in FIG. 1.

This configuration too allows to perform a color reproduction corresponding to the recording medium to be used, thereby being capable of establishing an agreement of colors that are reproduced.

Figure 13:
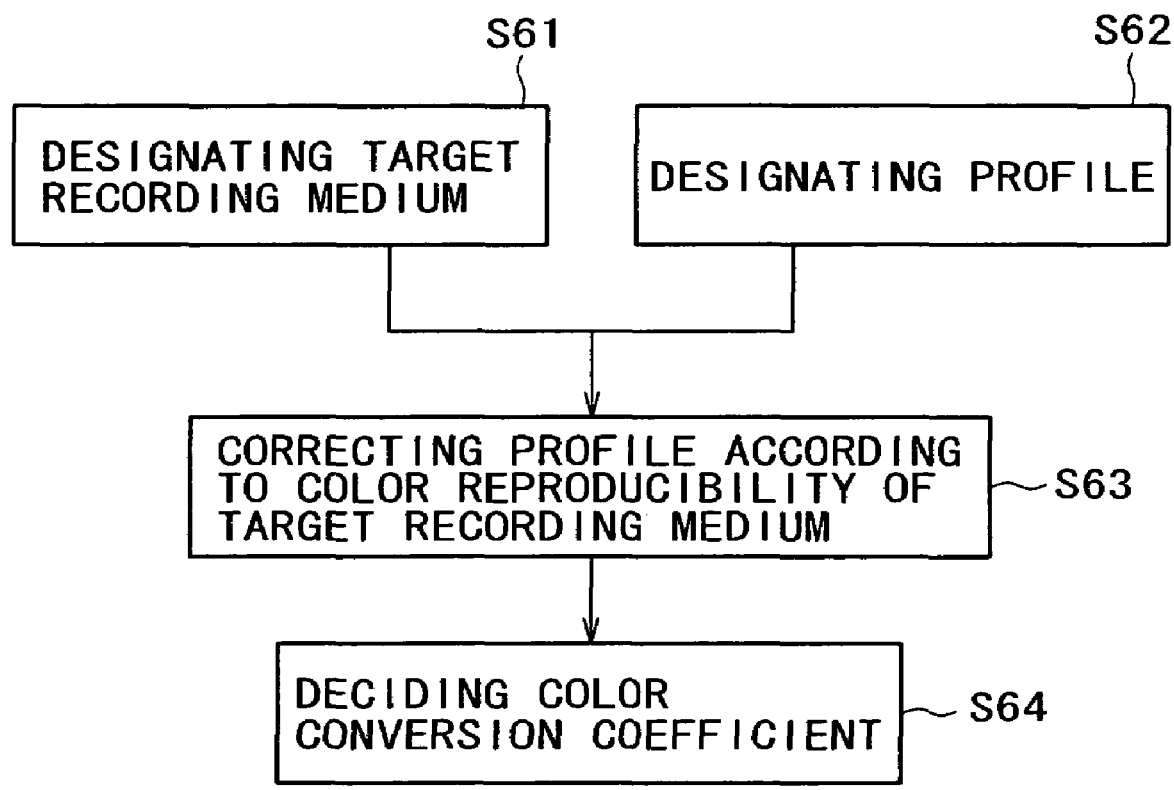
FIG. 13 is a flowchart showing one example of an operation in the third embodiment of the invention.

FIG. 13 is a flowchart showing one example of an operation in the third embodiment of the present invention.

A target recording medium is designated at the recording medium designating part 1 at a step S61, and a profile is designated at the profile designating part 2 at a step S62. Either the designation of the recording medium or the designation of the profile may be executed first.

This designation can be performed, for example, on the display screen shown in FIGS. 3 and 4 in the first embodiment.

After the designation of the target recording medium and the profile are completed, the standard color conversion coefficient correcting part 21 corrects the designated profile according to the difference in color reproducibility between the designated target recording medium and the standard recording medium at a step S63.

Then, at a step S64, a color conversion coefficient used for the color conversion process is decided at the input image signal color conversion part 22 by use of the corrected profile. In the case where the designated target recording medium and the standard recording medium are matched, the color conversion coefficient may be decided from the designated profile without performing the correction at the standard color conversion coefficient correcting part 21.

As described above, the color conversion coefficient decided at the step S64 is set to the input image signal color conversion part 22 for performing the color conversion process to the input color image signal at the input image signal color conversion part 22, and further, the color-converted signal is converted at the output image signal conversion part 5 into an output color image signal that is dependent on the device actually forming an image, and the resultant is outputted.

Figure 14:
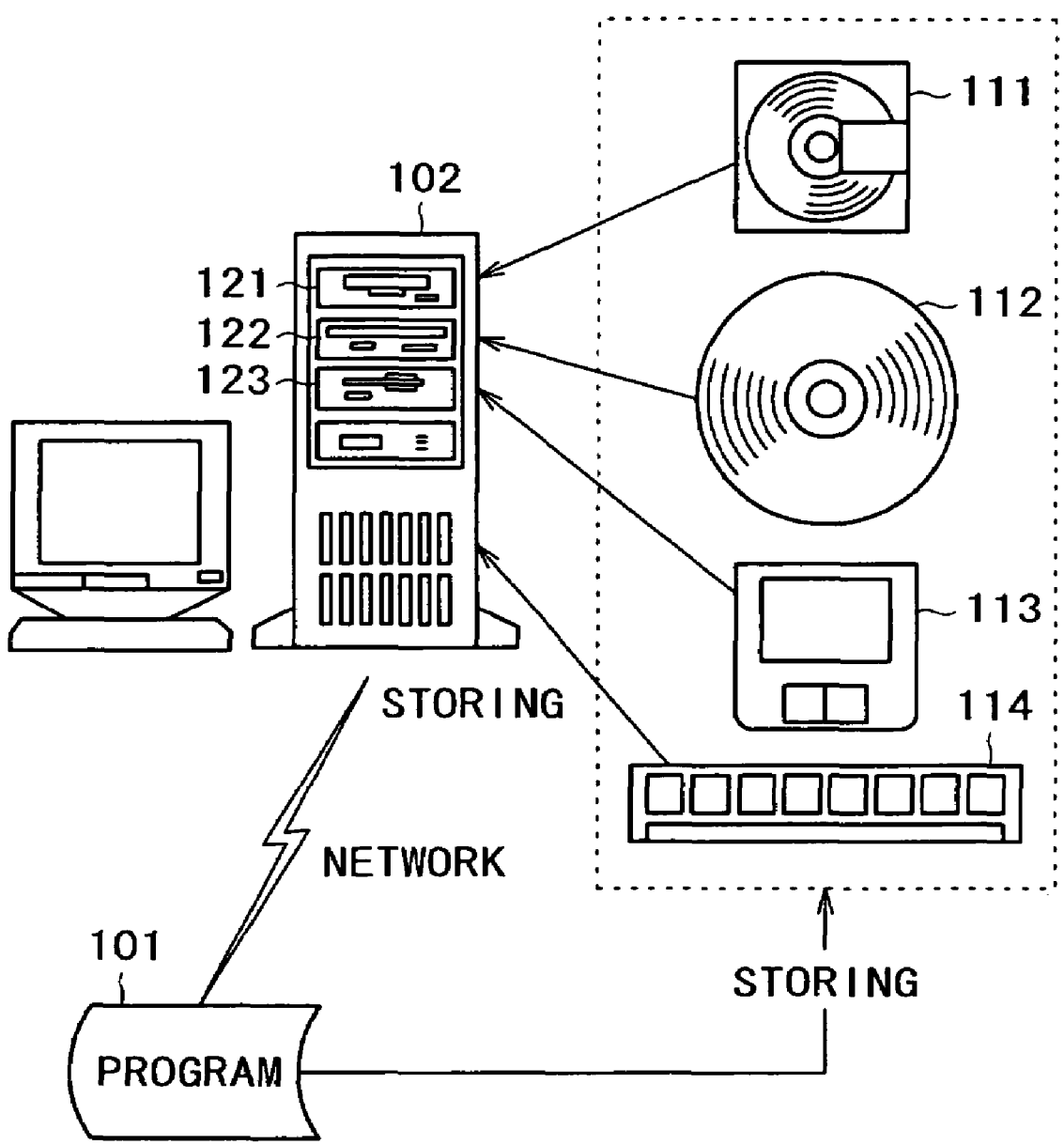
FIG. 14 is an explanatory view of one example of a computer program in the case where a function of an image processing device and image processing method of the present invention are implemented with a computer program and a recording medium that stores the computer program.
Figure 15A:
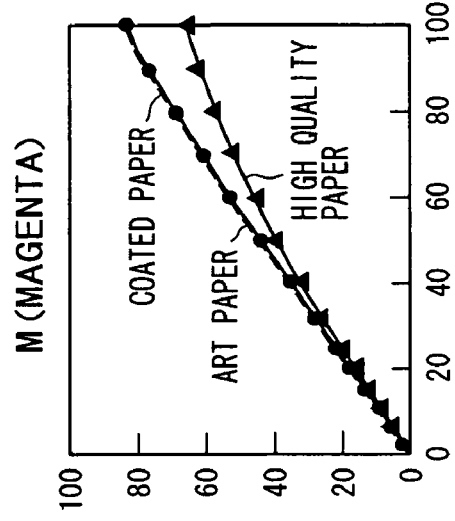
FIG. 15A to 15D are graphs showing the CMYK tone characteristic in a typical paper quality.
Figure 15B:
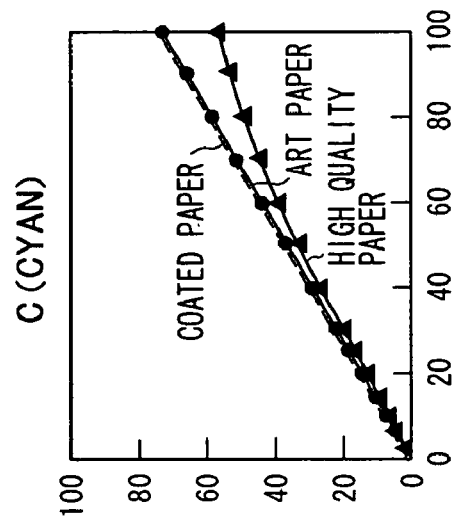
Figure 15C:
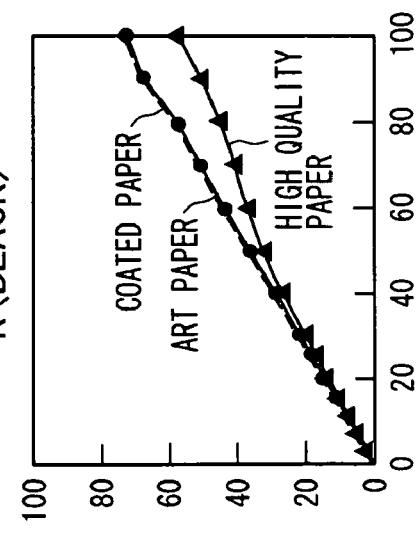
Figure 15D:
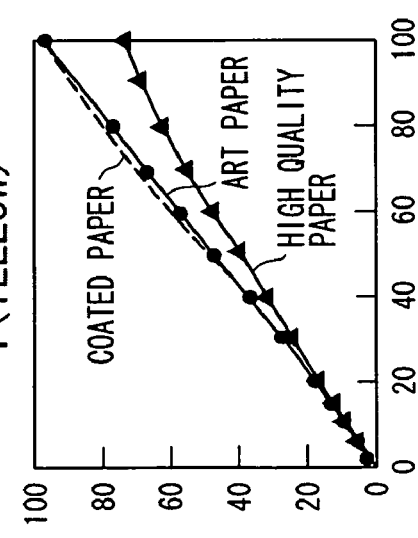
Figure 16:
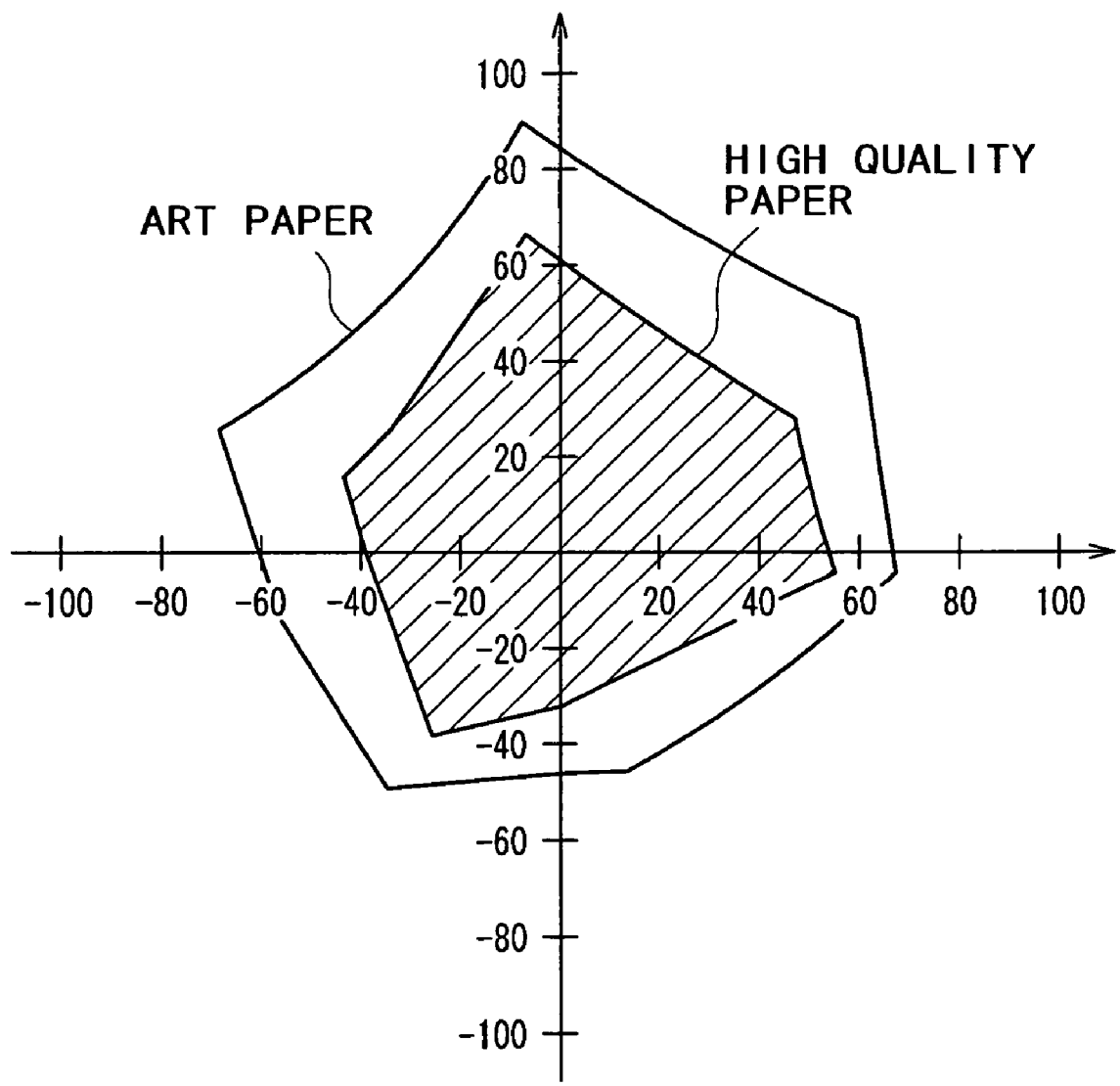
FIG. 16 is a graph showing a color reproduction area in a typical paper quality.

FIG. 14 is an explanatory view showing one example of a computer program in the case where a function of an image processing device and image processing method of the present invention are implemented with a computer program and a recording medium that stores the computer program. In the figure, numeral 101 denotes a program, 102 denotes a computer, 111 denotes an opto-magnetic disk, 112 denotes an optical disk, 113 denotes a magnetic disk, 114 denotes a memory, 121 denotes an opto-magnetic disk device, 122 denotes an optical device and 123 denotes a magnetic disk device.

All of or a part of each function explained in the aforesaid image processing device and the image processing method can be implemented by the program 101 that can be executed with a computer. In this case, the program 101 and data used by the program can be stored in a memory medium readable by the computer. The memory medium causes a changing state of magnetism, light, electricity and the like according to the description content in the program with respect to the reading device provided in the hardware resource in the computer and can transmit the description content of the program to the reading device in the form of the signal corresponding to the changing state. Examples of the memory medium include the opto-magnetic disk 111, optical device 112 (including CD or DVD), magnetic disk 113, memory 114 (including IC card, memory card and the like), and the like. It is needless to say that these memory mediums are not limited to portable types.

The program 101 is stored in these memory mediums, which are then installed to, for example, the opto-magnetic disk device 121, optical disk device 122, magnetic disk device 123 or a memory slot not shown of the computer 102 to read out the program 101 from the computer, thereby being capable of executing the function of the image processing device and image processing method.

Alternatively, the memory medium is installed in advance to the computer 102, and the program 101 is transferred to the computer 102 via, for example, a network, to be stored in the memory medium for execution.

A part of the function can of course be constituted of hardware, or all functions may be composed with a hardware. Alternatively, the function can be incorporated as a part of the other software.

As described hereinabove, an image processing device according to the present invention for performing a color process to a color image signal can designate a recording medium to be actually used as well as a profile in which a color reproducibility of a standard recording medium that is a target of color conversion is described. The invention is characterized in that color conversion is executed to a color image signal according to these designated profile and recording medium. An externally supplied profile can be utilized as the designated profile. Further, in the case where an externally supplied profile is used, the designation of the recording medium used upon creating this profile is also performed, whereby the designated recording medium is handled as a standard recording medium. Alternatively, the recording medium used upon creating the externally supplied profile is predicted and the predicted recording medium can be handled as the standard recording medium.

As for a color conversion process, the difference in color reproducibility between the designated recording medium and the standard recording medium is corrected, with which color conversion according to the designated profile can be performed. Alternatively, it is configured such that the designated profile is corrected according to the difference in color reproducibility between the designated recording medium and the standard recording medium, and the color conversion is performed according to the corrected profile.

The present invention designates a profile to be used and a recording medium to be used, whereby, according to a recording medium, an optimum color conversion process is applied to a color image signal in the designated recording medium to be used by, for example, correcting the difference between the recording medium to be used and the standard recording medium or changing a profile. This brings an effect that a satisfactory color reproduction can simply be implemented.

Further, a profile to be used and a recording medium to be used are separately designated, to thereby be capable of holding down the number of profile compared to the case where profiles are created in advance considering each recording medium, making it easy for a user to select a profile. Moreover, a profile can be supplied from the outside. In this case, a difference between the recording medium to be used and the recording medium that is designated as a standard recording medium is similarly corrected, or a profile is changed based upon the difference, thereby being capable of performing an optimum color reproduction on the recording medium to be used.

The entire disclosure of Japanese Patent Application No. 2003-418326 filed on Dec. 16, 2003 including specification, claims, drawings and abstract is incorporated herein by reference in its entirety.

What is claimed is:

1. An image processing device that performs a color process to a color image signal, comprising:
an interface for selecting a profile describing color reproducibility to define a color conversion coefficient provided when performing color conversion of the color image signal, a standard recording medium corresponding to the profile, and a used recording medium to be actually used, each profile being defined with respect to one standard recording medium;
profile designating part that designates a designated profile from among a plurality of the profiles according to an instruction of the interface;
standard recording medium defining part that defines the standard recording medium corresponding to the designated profile;
recording medium designating part that designates a used recording medium according to an instruction of the interface; and
color converter that determines whether a defined standard recording medium and the used recording medium are the same, and when the defined standard recording medium and the used recording medium are the same, performs color conversion of the color image signal based on the designated profile, and when the defined standard recording medium and the used recording medium are different, performs the color conversion of the color image signal based on a difference in color reproducibility between the defined standard recording medium and the used recording medium, and a designated profile.

2. The image processing device according to claim 1, wherein the color converter can utilize an externally supplied profile as the designated profile.

3. The image processing device according to claim 2, wherein in a case where the externally supplied profile is designated by the profile designating part, the standard recording medium defining part receives designation of a recording medium used upon creating the designated profile and defines the received recording medium as the designated standard recording medium.

4. The image processing device according to claim 2 further comprising recording medium predicting part that predicts a recording medium used upon creating the externally supplied profile, wherein
the standard recording medium defining part defines the recording medium predicted by the recording medium predicting part as the defined standard recording medium.

5. The image processing device according to claim 4, wherein the recording medium predicting part predicts the recording medium by use of a color look-up table in the profile.

6. The image processing device according to claim 4, wherein the recording medium predicting part predicts the recording medium by referring to a value obtained by converting and outputting a predetermined value according to the profile, the predetermined value including K=100% and a saturated color.

7. The image processing device according to claim 1, wherein the color converter corrects the difference in color reproducibility between the used recording medium and the defined standard recording medium as well as perform color conversion according to the designated profile.

8. The image processing device according to claim 1, wherein the color converter corrects the designated profile in accordance with the difference in color reproducibility between the used recording medium designated and the designated standard recording medium, and performs color conversion according to the corrected profile.

9. An image processing method for performing a color process to a color image signal, comprising:

selecting a profile describing color reproducibility to define a color conversion coefficient provided when performing color conversion of the color image signal, and a used recording medium to be actually used, each profile being defined with respect to one standard recording medium;

receiving designation of a designated profile from among a plurality of the profiles and designation of a used recording medium, according to selecting the profile and the used recording medium;

defining a standard recording medium corresponding to the designated profile;

determining whether a defined standard recording medium and the used recording medium are the same; and performing a color conversion process to the color image signal based on the designated profile when the defined standard recording medium and the used recording medium are the same, and the color conversion process to of the color signal image signal based on a difference in color reproducibility between the defined standard recording medium and the used recording medium, and the designation of the profile when the defined standard recording medium and the used recording medium are different.

10. The image processing method according to claim 9, wherein the color conversion process can utilize an externally supplied profile as the designated profile.

11. The image processing method according to claim 10 further comprising receiving the designation of a recording medium used upon creating the profile in a case where the externally supplied profile is designated, wherein the received recording medium is defined as the defined standard recording medium in the color conversion process.

12. The image processing method according to claim 10 further comprising predicting a recording medium used upon creating the externally supplied profile, and wherein defining the predicted recording medium is defined as the defined standard recording medium.

13. The image processing method according to claim 12, wherein predicting the recording medium is performed by use of a color look-up table in the profile.

14. The image processing method according to claim 12, wherein predicting the recording medium is performed by referring to a value obtained by converting and outputting a predetermined value according to the profile, the predetermined value including K=100% and a saturated color.

15. The image processing method according to claim 9, wherein the color conversion process corrects the difference in color reproducibility between the used recording medium and the defined standard recording medium as well as performs color conversion according to the designated profile.

16. The image processing method according to claim 9, wherein the color conversion process corrects the designated profile in accordance with the difference in color reproducibility between the used recording medium and the defined standard recording medium, and performs color conversion according to the corrected profile.

17. A computer-readable medium storing an image processing program of instructions executable by the computer to perform a function for making the computer execute a color process to a color image signal, the function comprising the step of making the computer execute the image processing method according to claim 9.

* * * * *